United States Patent
Endres et al.

(10) Patent No.: US 9,945,058 B2
(45) Date of Patent: Apr. 17, 2018

(54) MULTI-NEEDLE MACHINE AND METHOD FOR PRODUCING REINFORCED MATERIALS

(71) Applicant: Airbus Operations GmbH, Hamburg (DE)

(72) Inventors: Gregor Christian Endres, Pfaffenhofen (DE); Hans-Jürgen Weber, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 424 days.

(21) Appl. No.: 14/649,351

(22) PCT Filed: Dec. 3, 2013

(86) PCT No.: PCT/EP2013/075402
§ 371 (c)(1),
(2) Date: Jun. 3, 2015

(87) PCT Pub. No.: WO2014/086786
PCT Pub. Date: Jun. 12, 2014

(65) Prior Publication Data
US 2015/0322608 A1    Nov. 12, 2015

(30) Foreign Application Priority Data
Dec. 5, 2012 (DE) ................ 10 2012 023 815

(51) Int. Cl.
*D05B 39/00* (2006.01)
*D04H 18/02* (2012.01)
*B29C 70/24* (2006.01)

(52) U.S. Cl.
CPC ............ *D04H 18/02* (2013.01); *B29C 70/24* (2013.01); *D05B 39/00* (2013.01)

(58) Field of Classification Search
CPC ......... D05C 15/00; D05B 61/00; D05B 85/00
See application file for complete search history.

(56) References Cited

U.S. PATENT DOCUMENTS

| | | | | |
|---|---|---|---|---|
| 461,793 | A | * 10/1891 | Briggs | .............. D05B 61/00 112/421 |
| 1,030,815 | A | * 6/1912 | Holmes | ............. D05B 61/00 112/475.09 |

(Continued)

FOREIGN PATENT DOCUMENTS

| | | |
|---|---|---|
| CN | 101417518 A | 4/2009 |
| DE | 102005024408 A1 | 11/2006 |

(Continued)

OTHER PUBLICATIONS

German Patent Office, German Search Report for German Patent Application No. 10 2012 023 815.0 dated May 27, 2015.

(Continued)

*Primary Examiner* — Tejash Patel
(74) *Attorney, Agent, or Firm* — Lorenz & Kopf, LLP

(57) ABSTRACT

This relates to the manufacturing of reinforced materials, such as reinforced cellular materials or reinforced textiles, for example. Reinforcement is achieved by including a textile semi-finished product into the material to be reinforced, by providing the semi-finished product at the rear side of the material in a zigzag or wave-like manner and then pulling the semi-finished product through the material by a plurality of needles. Thus, the manufacturing process may be performed in a time saving manner.

13 Claims, 7 Drawing Sheets

(56) References Cited

U.S. PATENT DOCUMENTS

2009/0252917 A1* 10/2009 Weber .................... B29C 44/56
428/102
2009/0252971 A1 10/2009 Weber et al.

FOREIGN PATENT DOCUMENTS

| DE | 102005034400 A1 | 2/2007 |
| DE | 102007033869 A1 | 1/2009 |
| DE | 102007051422 A1 | 4/2009 |
| DE | 102007055684 A1 | 6/2009 |
| DE | 102009050904 A1 | 4/2011 |
| JP | H 0994887 A | 4/1997 |

OTHER PUBLICATIONS

International Searching Authority, International Search Report for International Patent Application No. PCT/EP2013/075402 dated May 20, 2015.
The People's Republic of China, Chinese Office Action for Chinese Patent Application No. 201380063682.4 dated Mar. 24, 2016.

* cited by examiner

MULTI-NEEDLE MACHINE AND METHOD FOR PRODUCING REINFORCED MATERIALS

CROSS-REFERENCE TO RELATED APPLICATIONS

This is a continuation of International Application No. PCT/EP2013/075402, filed Dec. 3, 2013, which application claims priority to German Patent Application No. 10 2012 023 815.0, filed Dec. 5, 2012, which are incorporated herein by reference in their entirety.

TECHNICAL FIELD

The embodiments described herein relate to the technical field of producing reinforced materials. In particular, the embodiments relate to a method for producing reinforced cellular materials, reinforced textiles or combinations thereof, to a multi-needle machine for producing reinforced cellular materials, reinforced textiles or combinations thereof, to the use of a multi-needle machine for producing reinforced cellular materials, reinforced textiles or combinations thereof, to the use of a multi-needle machine for producing a structural component for a vehicle, and to the use of a multi-needle machine for producing a wing of a wind power station.

BACKGROUND

In addition, other objects, desirable features, and characteristics will become apparent from the subsequent summary and detailed description, and the appended claims, taken in conjunction with the accompanying drawings and this background.

Owing to their good ratio of rigidity and stiffness to thickness, composite materials, and in particular sandwich components, are widely used in the field of aircraft construction. Sandwich constructions are generally formed of an upper and a lower cover layer or cover ply, between which there is, for example, a honeycomb-type core structure formed of vertical cells of hexagonal cross-section, designed to increase rigidity.

Owing to their multi-functionality, cellular materials are of particular interest in component production and in the field of enhanced component properties for application in sandwich constructions for large-sized structural components, in particular in aviation. Sewing techniques, with which fibres or threads can be incorporated in rigid foam components, are used to reinforce foam-based sandwich constructions. After a resin infiltration process, the regions interspersed with fibres then help to mechanically reinforce the cellular material.

The fibres or threads (also referred to as semi-finished textiles products hereafter) used for reinforcement may be what are known as rovings, which consist of parallel fibres. They may also be threads consisting of twisted or plied fibres.

In known sewing methods, first a needle penetrates into and pierces the cellular material. At the same time, the needle thereby incorporates the thread into the cellular material. At this stage, while being inserted into the cellular material, the thread extends parallel to and substantially over the entire length of the needle. The hole size of the puncture is thus determined by the needle diameter and the thickness of the thread.

After the needle withdraws from the cellular material or textile, a hole is left behind, the diameter of which is relatively large by comparison with the diameter of the incorporated thread. This means that after resin infiltration, the hole region not filled with fibres is filled with resin, and this may increase the weight of the finished component.

DE 10 2005 024 408 A1 describes the reinforcement of cellular materials by means of a knotting method in that the needle first pierces the material (the cellular material) to be reinforced and only then, in the region of the underside of the cellular material, takes up the semi-finished textiles product (i.e. the roving or thread) and draws the same through the pierced hole upon the subsequent backward movement.

In this manner, the hole diameter can on the whole be kept relatively small.

SUMMARY

The materials to be reinforced are, for example, cellular materials or other materials that are suitable as core materials in sandwich constructions. In addition to cellular materials, textiles, such as felts or other fibre-woven fabrics, are also considered. The semi-finished textiles products used to reinforce the materials may be fibre bundles in the form of rovings of a plurality of individual fibres or monofilaments, individual fibres themselves or threads produced by twisting individual fibres or fibre bundles.

A first aspect of the embodiment provides a method for producing reinforced materials, in particular reinforced cellular materials, reinforced textiles or combinations thereof. In particular, the materials to be reinforced may be sandwich components comprising one or more intermediate and/or cover layers in addition to a core material.

This method can be used to produce sandwich construction components, which may be either planar components having two opposing surfaces or, in the most basic case, having two opposing, parallel surfaces. Often, these components have two-dimensional or three-dimensional curvatures or variable thickness along the extension of the components.

The cellular material may be any given cellular material. In the aviation field, high-quality PMI rigid cellular materials often prove advantageous. However, other cellular materials may also be used that consist, for example, of polyvinylchloride or polyurethane.

One aspect of the embodiment should be considered to be that arranging a semi-finished textiles product (roving, thread, etc.) in a zigzag, wave-like or any other non-linear manner on the side of the rear surface of the material (cellular material, textile, etc.) to be reinforced. In this context, non-linear arrangement means that the portion of the semi-finished textiles product that is fed in the work region of a linked group of needles of the multi-needle machine does not extend in a straight line but rather in a zigzag, wavy or otherwise non-straight line, such that there is sufficient excess for the semi-finished textiles product to be later drawn into the holes pierced by the needles.

Prior to or after this step, a plurality of needles is guided through the material to be reinforced, such that the individual needles penetrate the rear surface of the material. After the semi-finished textiles product is then inserted into the individual needles, the needles each draw one portion of the semi-finished textiles product into the material, by means of the needles being withdrawn from the material.

It is important at this stage that a sufficient length of the semi-finished textiles product was fed, since portions of the product are then drawn by each individual needle through the corresponding hole so as to fill the hole.

As explained, this is, for example, a knotting method rather than a sewing method, in which the semi-finished textiles product is at first present solely on the rear surface of the material to be reinforced, yet not on the front side. Since the needles can be moved simultaneously, the production speed is considerably faster.

According to one embodiment, the semi-finished textiles product is fed in a linear manner on the side of the rear surface of the material to be reinforced and then arranged in a zigzag, wave-like or otherwise non-linear manner, for example by being positioned by rollers, hooks or the like which engage into the semi-finished textiles product.

According to a further embodiment, the semi-finished textiles product is arranged in a non-linear manner by means of the engagement of a plurality of hooks into the semi-finished textiles product and of the subsequent displacement of the hooks in a plane that is substantially parallel to the plane of the rear surface of the material. In this operation, the needles withhold portions of the semi-finished textiles product such that, in the end, sub-portions of the semi-finished textiles product are not moved.

Alternatively or in addition to the hooks, individual rollers or pegs may also be displaced and thereby transfer the semi-finished textiles product into the non-linear arrangement.

According to a further embodiment, the hooks, rollers or pegs are displaced in a sequence, such that at any point in time just one individual hook, one individual roller or one individual peg, or a group thereof, is moved.

According to a further embodiment, the plurality of needles carries out an intermediate stroke after the non-linear arrangement of the semi-finished textiles product, such that the semi-finished textiles product is taken up by the needles. For this purpose, the individual needles comprise eyelets.

According to a further embodiment, the semi-finished textiles product is fixed to the rear surface of the material, for example by means of the needles being withdrawn to some extent, such that the semi-finished textiles product penetrates down into the holes to some extent.

According to a further embodiment, the semi-finished textiles product is severed in the region of the hooks, rollers or pegs, such that for each hole there is a single, separate portion of the semi-finished textiles product that can then be drawn into the corresponding hole.

According to a further embodiment, each seam is formed by arranging a loop of the semi-finished textiles product on a front surface that is opposite the rear surface of the material. A further loop of the semi-finished textiles product is then drawn through this loop. Here the loop extends in a direction that is perpendicular to a direction along that the semi-finished textiles product is arranged on the side of the rear surface of the material after it is drawn into the material. This produces a new type of seam formation in that the semi-finished textiles product assumes a direction on the underside of the material to be reinforced that, together with the loops of the semi-finished textiles product on the upper side of the material, encloses an angle that is not 0 degree, for example it may be 35 degrees or 45 degrees or 90 degrees. The semi-finished textiles product is not cut in this embodiment.

In this and in other embodiments, the semi-finished textiles product may be cut into individual portions only on the underside of the material to be reinforced, only on the upper surface of the material or on both the underside and the upper side of the material.

The non-linear arrangement of the semi-finished textiles product in the region of the underside of the material to be reinforced makes it possible to provide a sufficient length of the semi-finished textiles product for it to then be drawable into the individual holes. The non-linear arrangement of the semi-finished textiles product need not follow a regular, periodic pattern here but may also be irregular. This is important, for example, if the material to be reinforced is of variable thickness.

According to a further embodiment, the portions of the semi-finished textiles product drawn into the material are compressed as they are drawn into the material. This may occur because the diameter of the hole is smaller than the diameter of the semi-finished textiles product before it is drawn into the material.

A further object of the embodiment provides a multi-needle machine for producing reinforced cellular materials, reinforced textiles or combinations thereof, which comprises a plurality of needles that are movable in a stroke-like manner and are intended to pierce a material to be reinforced, which material may be the cellular material, the textile or a combination thereof, for taking up a semi-finished textiles product and for the needles to each draw one portion of the semi-finished textiles product into the material.

Furthermore, a feed device is provided that is designed for the non-linear (for example zigzag or wave-like) arrangement of the semi-finished textiles product on the side of the rear surface of the material to be reinforced.

For example, the multi-needle machine comprises one or more needle beams that carry the plurality of needles, such that all the needles can be moved simultaneously by the movement of the needle beam(s). In this and the other embodiments, all the needles may also be driven on an individual basis.

According to a further embodiment of the embodiment, the feed device comprises a plurality of hooks, rollers or pegs for the non-linear arrangement of the semi-finished textiles product on the side of the rear surface of the material to be reinforced.

A further object provides the use of a multi-needle machine as described above and in the following for producing reinforced cellular materials.

A further object provides the use of a multi-needle machine as described above and in the following for producing a structural component for a vehicle.

A further object provides the use of a multi-needle machine as described above and in the following for producing a wing of a wind power station.

In the following, embodiments of the embodiment are described with reference to the drawings.

BRIEF DESCRIPTION OF THE DRAWINGS

The present embodiments will hereinafter be described in conjunction with the following drawing figures, wherein like numerals denote like elements, and.

DETAILED DESCRIPTION

Figure 1A:
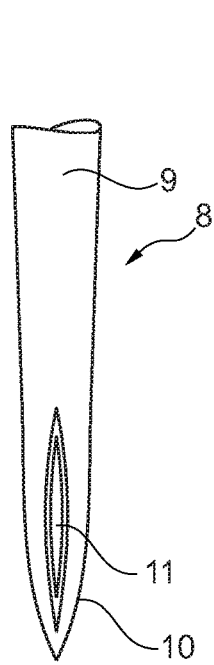
FIGS. 1A-1C show three differently designed needles that can be used to carry out a method according to an embodiment.

The following detailed description is merely exemplary in nature and is not intended to limit the embodiments or the application and uses of the embodiments. Furthermore, there is no intention to be bound by any theory presented in the preceding background or the following detailed description.

The representations in the drawings are schematic and not to scale.

Where the following description of the drawings uses like reference numerals in various drawings, the reference numerals denote like or similar elements. However, like or similar elements may also be denoted with different reference numerals.

Figure 1B:
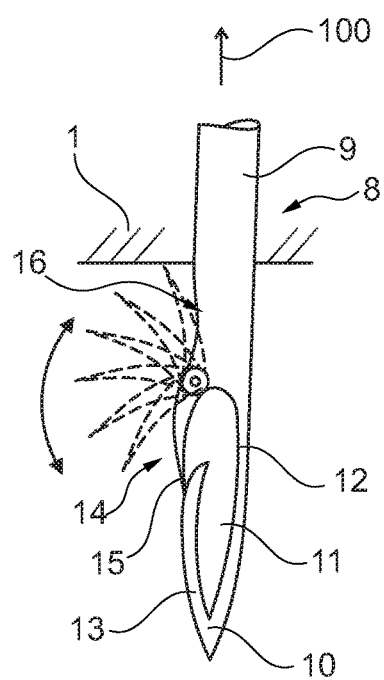
Figure 1C:
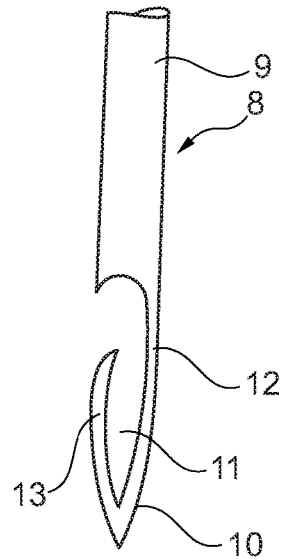

FIG. 1A to 1C show three differently designed needles that can be used to carry out the method. FIG. 1A shows a first embodiment of a hooked needle 8 comprising a rectilinear shaft 9 that tapers at its leading end to a tip 10. In the region of the tip 10, the needle 8 has an eyelet 11 that is, however, provided with an opening on one side so as to be able to incorporate thereby a fibre bundle 3 into the eyelet region of the needle 8. The eyelet region 11 of the hooked needle 8 thus consists of a first arm 12 that continues to the tip 10 and a second arm 13 that extends (with a convex curvature) from the tip 10 back towards the shaft 9, albeit without reaching the shaft.

The hooked needle 8 shown in FIG. 1B corresponds substantially to that shown in FIG. 1A, yet, by comparison therewith, additionally comprises a closure mechanism 14 that is designed to close the opening of the eyelet 11 as the hooked needle 8 is withdrawn from the material 1 in the direction of the arrow 100. The closure mechanism 14 consists substantially of a flap 15 that, in its initial position, rests on the shaft of the needle 8 in a tapered region 16. As soon as the free end of this flap 15 comes into abutment against the material 1 as the needle 8 is withdrawn therefrom, the flap moves in the counter-clockwise direction from its initial position into a position in that it fully closes the opening of the eyelet 11, as shown in FIG. 1B. First of all, this prevents the hooked end of the second arm 13 from damaging the inner wall of a through-hole 2 in the material 1 as the needle 8 is withdrawn from the material 1. Second, the closure mechanism 14 ensures that no fibres come loose from the fibre bundle 3 as they are drawn into the material 1. If the material 1 is pierced along with pre-applied cover plies, the closure mechanism 14 can prevent fibres in the vicinity of the needle 8 from being engaged and drawn into the hole interior upon withdrawal of the needle.

FIG. 1C shows a third embodiment of a needle 8 comprising a lenticular eyelet 11 in its tip region 10. The semi-finished textiles product is pushed or picked through the eyelet 11 of the needle in the longitudinal direction.

Figure 2:
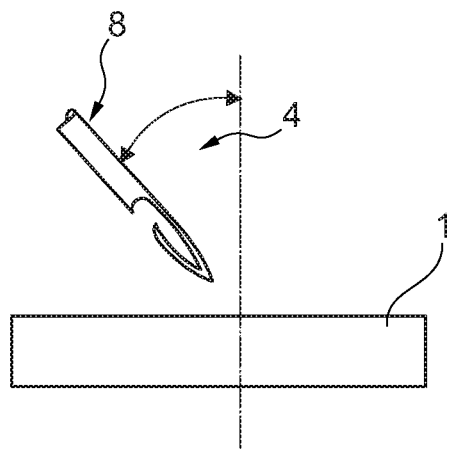
FIG. 2 shows an initial state in a method according to an embodiment.

FIG. 2 shows a needle 8 prior to insertion into the material 1, which may be a cellular material, a textile or a combination thereof. The tip of the needle 8 comprises an eyelet region that is open on one side. However, the needles in FIGS. 1A and 1B may also be used.

The needles may have an angle α (see reference numeral 4) in relation to the surface normal of the material 1. The angle α may vary between 0 degree and 90 degrees, such that a fibre bundle can thus be incorporated into the material 1 at any given angle α. This allows a "tailored" reinforcement to be achieved, so as to address specific stress situations to which the material 1 will be subjected in the later sandwich construction.

Figure 3:
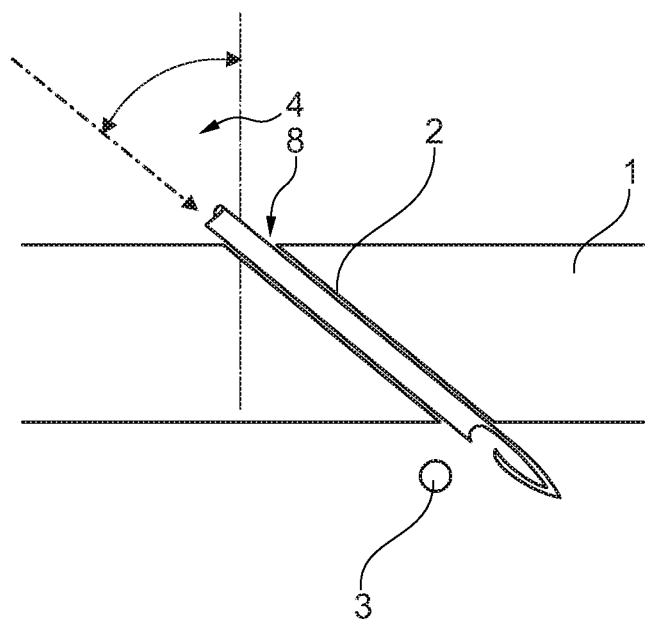
FIG. 3 shows an intermediate state in the method according to an embodiment.

FIG. 3 shows a stage in the production method in which the tip of the needle 8 has just penetrated the material 1. As a result of this penetration operation, a through-hole 2 has been incorporated into the material 1, which through-hole thus extends at an angle α through the material 1. A semi-finished textiles product 3 (for example, a 24K roving) is located beneath the material 1, in the region of the exit point of the needle 8 and as close as possible to the underside of the material 1. The semi-finished textiles product 3 is then picked up by the needle.

Figure 4:
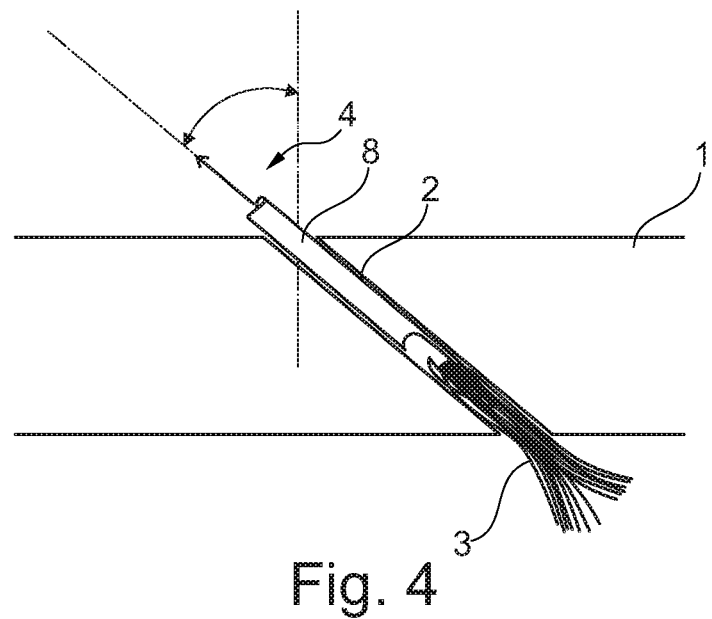
FIG. 4 shows a subsequent intermediate state in the method according to an embodiment.

In FIG. 4, the needle 8 is already being withdrawn from the material 1. As a result of this withdrawal, the semi-finished textiles product 3 picked up by the needle 8 is drawn into the through-hole 2, the semi-finished textiles product 3 being compressed during penetration of the through-hole.

Figure 5:
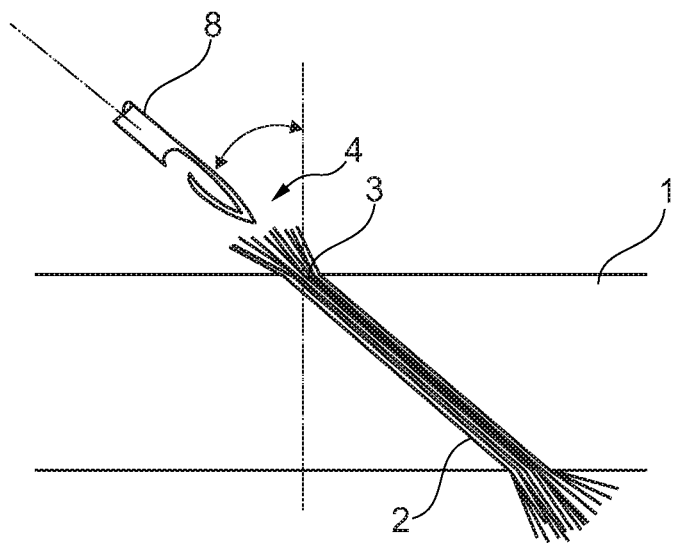
FIG. 5 shows a state in the method according to an embodiment that follows the intermediate state in FIG. 4.

In FIG. 5, a portion of the semi-finished textiles product 3 is finally located in the material 1 and thus passes out of the material on both the underside and the upper side. The through-hole 2 can then be infiltrated with a resin.

Figure 6A:
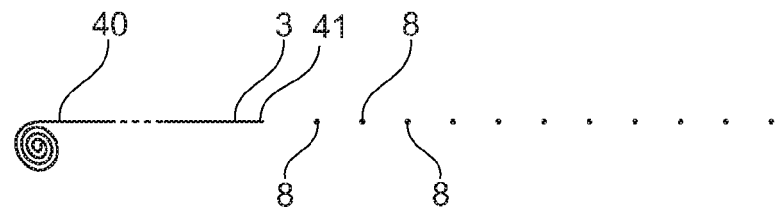
FIGS. 6A-6C show further method steps according to an embodiment.
Figure 6B:
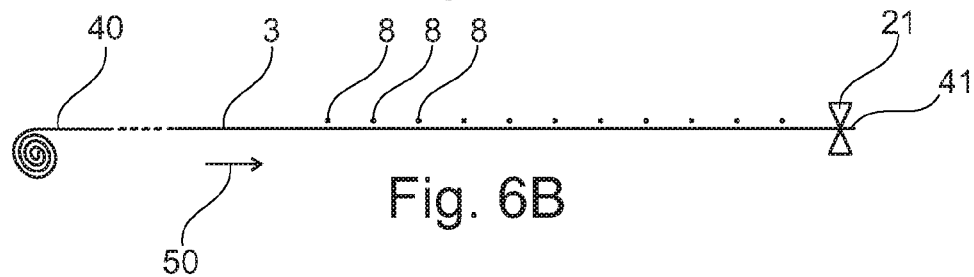
Figure 6C:
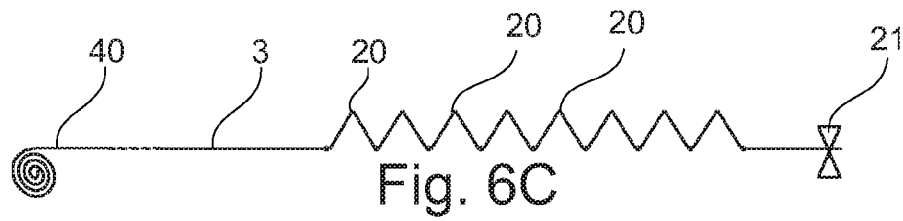

FIG. 6A to 6C show one way in which the semi-finished textiles product can be arranged first in a linear manner on the side of the rear surface of the material to be reinforced and then transferred into the non-linear state.

FIG. 6A shows how the semi-finished textiles product 3 is fed from a reservoir 40 in a linear manner in the region of the rear surface of the material to be reinforced in the direction of the arrow 50, as indicated by the dashed line. Before or after this linear feeding, the needle beam is moved together with the needles 8 attached thereto, such that the individual needles pierce the material and emerge on the rear surface of the material to be reinforced.

FIG. 6B shows the state in which the semi-finished textiles product 3 is fed in an entirely linear manner. At the free end 41, the product is clamped for example by a clamping device 21. Hooks, pegs or rollers 20 can now engage into the semi-finished textiles product 3 (see FIG. 6C) and then move perpendicular to the linear distribution direction of the semi-finished textiles product 3, for example parallel to the back surface of the material. This produces a zigzag pattern, for example; however, a wave pattern or a loop-type arrangement of the semi-finished textiles product 3 may also be produced in this manner. It is important that a sufficient length of the semi-finished textiles product 3 remains after this operation for individual portions thereof to be drawable into the holes pierced by the needles 8 and then emerge on the front side of the material.

Unlike other multi-needle machines, the present embodiment does not provide for a distinct gripping system to be assigned to each needle; instead, thread guidance is taken from the weave. For this purpose, the semi-finished textiles product is fed in a linear manner over the length of the needle beam (cf. FIG. 6B). In a following step, hooks, pegs or rollers 20, which are for example horizontal and each positioned centrally or at another point between two needles, engage into the semi-finished textiles product 3 and draw the same laterally, parallel to the surface of the material (cf. FIG. 6C), by means of the hooks, pegs or rollers 20 being withdrawn. Two effects are connected with this step. First, the semi-finished textiles product is applied to the needles 8 and, second, the necessary length of the semi-finished textiles product is adjusted hereby.

For example, not all the hooks, pegs or rollers 20 carry out this backward movement simultaneously, but do so at staggered intervals, starting with the hook, peg or roller that is the furthest away from the reservoir 40 (that is, the right hook or right roller or right peg). In this manner, the semi-finished textiles product is strained as little as possible since, there is a minimum number of diversion points. In the next step, the needle beam can then perform a first intermediate stroke, so that the semi-finished textiles product slips into the individual hooks and is fixed for example to the underside of the material and thus prevented from slipping.

If desired, the semi-finished textiles product can now be cut at the point of the horizontal fixing or hooked out of the hooks, or separated from the rollers or pegs. In the last case, independent, individual reinforcements are no longer produced, but rather pins connected in a seam-like manner.

Figures 7A, 7B:
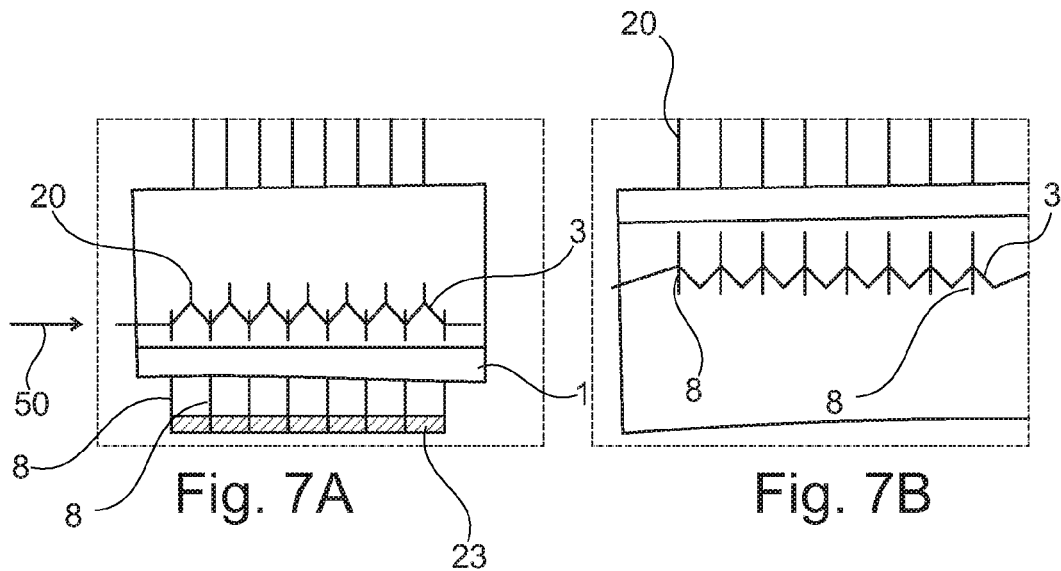
FIGS. 7A-7B show a possible arrangement of hooks, needles and semi-finished textiles product according to an embodiment.

FIG. 7A shows the arrangement of eight needles 8 and eight grippers or hooks 20 according to an embodiment. As can be seen in FIG. 7A, the hooks 20 have already been withdrawn perpendicular to the feed direction 50 (cf. also FIG. 6B), such that the semi-finished textiles product 3 assumes a zigzag pattern.

FIG. 7B shows the arrangement in FIG. 7A from a different perspective.

Figure 8:
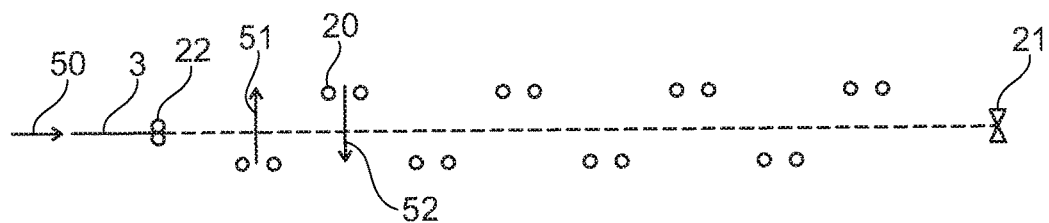
FIG. 8 shows a first method step according to an embodiment.

FIG. 8 shows a multi-needle machine in a first phase of the method according to an embodiment. The multi-needle machine in this case comprises a plurality of individual rollers 8 instead of hooks, which rollers are each arranged in pairs on opposite sides of the semi-finished textiles product 3 to be fed in a linear manner.

Figure 9:
FIG. 9 shows a second method step according to an embodiment.

FIG. 9 shows the multi-needle machine in FIG. 8 in a second phase of the method, in which the semi-finished textiles product 3 has already been fed in a linear manner, as indicated by the dashed line in FIG. 8, whereupon the rollers 8 were moved in pairs and substantially parallel to the rear surface of the material to be reinforced, perpendicular to the direction 50 of the semi-finished textiles product. In this process, the pairs of rollers located on the right in the distribution direction 50 of the semi-finished textiles product 3 are displaced upwards (cf. arrow 51 in FIG. 8), whereas the pairs of rollers located on the left-hand side of the semi-finished textiles product 3 move downwards (cf. reference numeral 52 in FIG. 8).

This movement then produces the "wave-like" pattern in FIG. 9.

It should be borne in mind that the individual "waves" may also have different amplitudes, that therefore, in other words, the distances by which the pairs of rollers move may vary from one pair of rollers to the next, for example depending on the local thickness of the material intended for reinforcement.

As can be seen in FIGS. 8 and 9, the free end of the semi-finished textiles product 3 can be clamped by a clamping device 21 so as to be immovable in relation to the clamping device.

Figure 10A:
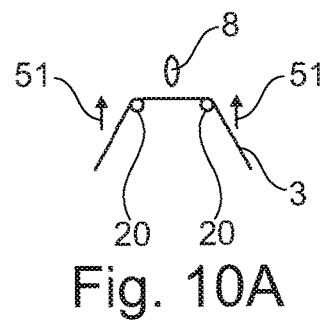
FIGS. 10A, 10B, 11A, 11B, 12 and 13 show further method steps according to the embodiments.
Figure 10B:
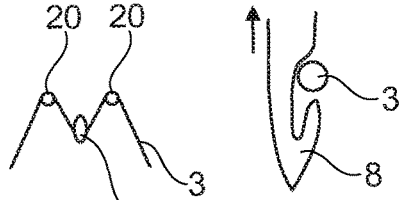

FIGS. 10A and 10B show another way in which to arrange the semi-finished textiles product 3 in a non-linear manner, before it is drawn into the holes. In this case, the needles 8 have already pierced the material, and the rollers, hooks or pegs 20 move towards the needle in the direction of the arrow 51, so as to form a zigzag pattern of the semi-finished textiles product 3, as can be seen in FIG. 10B. If the needle 8 now withdraws, it takes up the semi-finished textiles product 3. This can take place in the form of what is known as an intermediate stroke, after which the needle stops again, such that the semi-finished textiles product can be cut into individual portions.

Figure 11A:
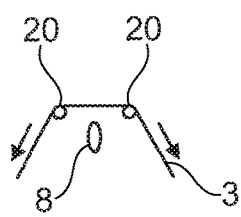
Figure 11B:
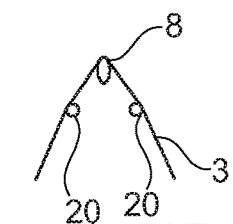

FIGS. 11A and 11B show another way in which to arrange the semi-finished textiles product 3 in a non-linear manner, in that the rollers, hooks or pegs 20 are first moved upwards, after which the needles 8 are then pricked through the material. Then, the rollers, hooks or pegs 20 move back down towards the needle, thereby producing the pattern shown in FIG. 11B.

Figure 12:
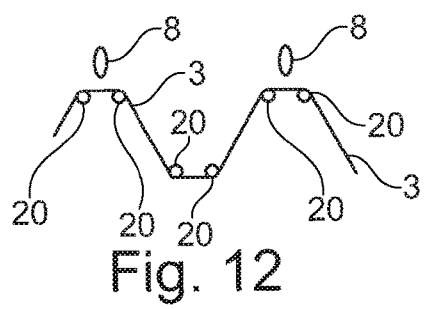
Figure 13:
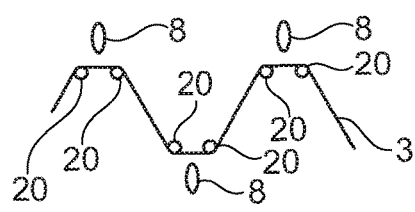

FIGS. 12 and 13 show two other ways of arranging the semi-finished textiles product 3 in a non-linear manner. The embodiment in FIG. 12 provides a needle beam that is located on the "left-hand side" of the semi-finished textiles product 3. The semi-finished textiles product can be hooked into the individual needles 8 as per FIGS. 10A and 10B.

The embodiment in FIG. 13 provides two needle beams which are oriented so as to be mutually parallel in the longitudinal direction, one being on the "left-hand side" of the semi-finished textiles product 3 and the other on the "right-hand side" of the semi-finished textiles product. These needle beams each carry a plurality of individual needles and can be moved independently of one another. Optionally, the needle beams may be tilted with respect to one another, such that the needles of one needle beam have a different puncture angle from the needles of the other needle beam. Thus, the first puncture angle may be, for example, +45 degrees with respect to the surface of the material, whereas the puncture angle of the needles of the other needle beam is −45 degrees with respect to the surface of the material.

Figure 14:
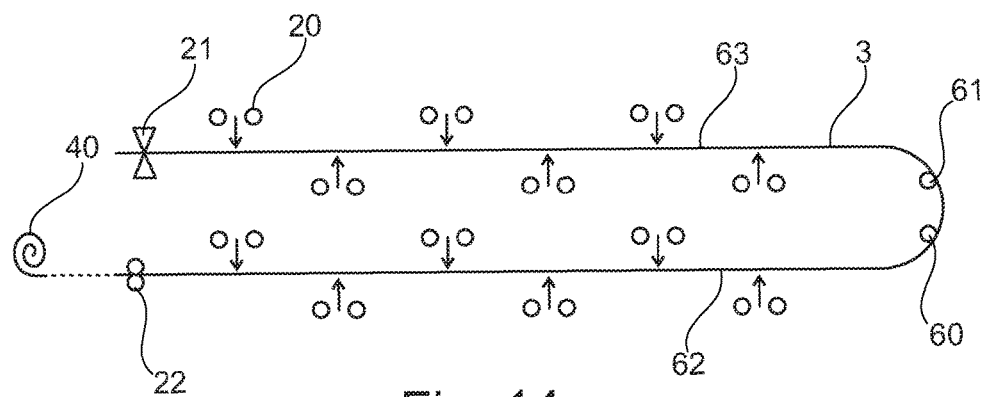
FIG. 14 shows an arrangement of semi-finished textiles product and rollers according to an embodiment.

FIG. 14 shows another way in which the semi-finished textiles product can be fed in a linear manner in two or more rows and then arranged in a non-linear (that is, wave-like, loop-type or zigzag) manner. First, two intake rollers 22 are provided, which guide the semi-finished textiles product 3 during feeding. These intake rollers 22 may also be provided in the other embodiments described.

The semi-finished textiles product is fed in a linear manner in a first portion 62 and then deflected around the rollers 60, 61, so as to again be feedable in a linear manner in a portion 63 that is parallel to the first portion 62. At the end of the semi-finished textiles product 3 is the retaining device 21, which clamps and pulls on the semi-finished textiles product. Similarly to in the previous embodiments, here too a plurality of rollers, hooks or pegs 20 are provided that transfer the semi-finished textiles product from the state in which portions thereof are fed in a linear manner into the non-linear arrangement.

Figure 15:
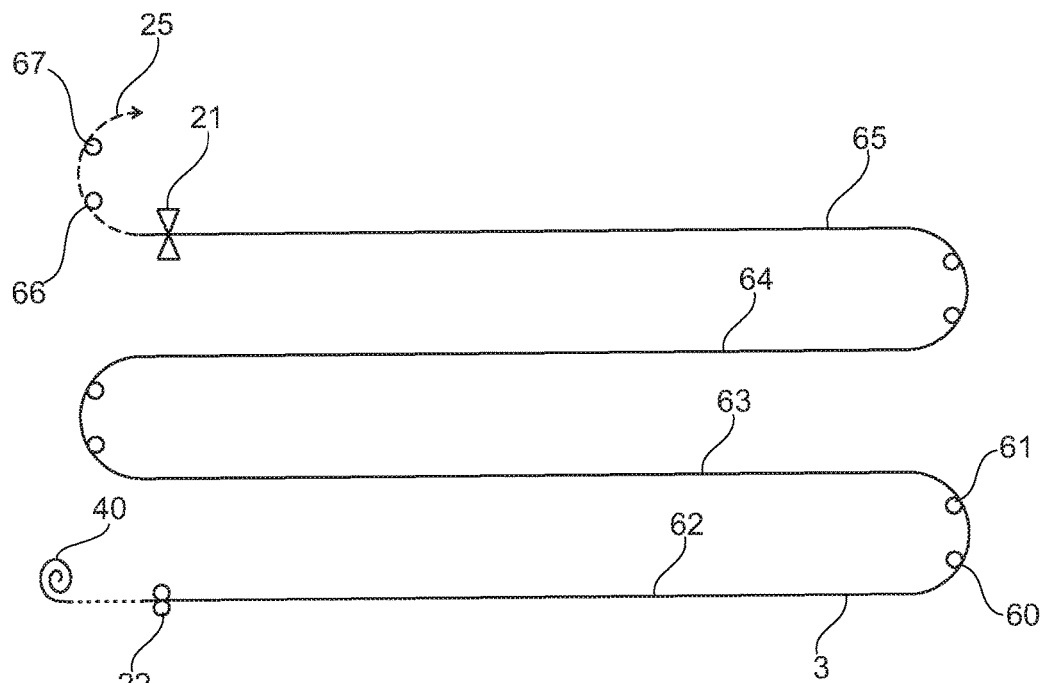
FIG. 15 shows an arrangement of a semi-finished textiles product according to a further embodiment.

FIG. 15 shows a similar example to that in FIG. 14, albeit with four parallel, linear regions 62, 63, 64, 65 of the semi-finished textiles product 3. Here the retaining device 21 travels further in the direction of the arrow 23 around the deflection rollers 66, 67, thus ultimately producing a meandering (in some portions), linear feed pattern. Once this operation is complete, corresponding rollers, hooks or pegs can form the non-linear, wave-like or zigzag pattern of the semi-finished textiles product (not shown in FIG. 15).

This embodiment also provides a plurality of needle beams that can be moved in sequence.

Simultaneous movement of the various needle beams is also possible, which needle beams may be designed in this case as linked, dual or multiple needle beams.

Moreover, it can be provided for the rollers, hooks or pegs 20 to move substantially parallel to the rear surface of the material, even where this surface is intended to be curved. The rollers may move for example along a circular path, whereby the curvature of the rear surface of the material can be at least approximated.

Figure 16:
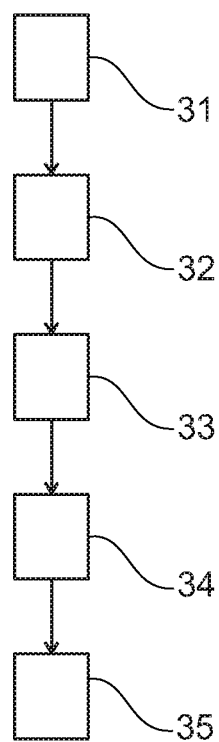
FIG. 16 is a flow diagram of a method according to an embodiment.

FIG. 16 shows a flow diagram of a method according to an embodiment. In step 31 a semi-finished textiles product is first arranged in a linear manner, or in a linear manner at least in some portions, on the side of the rear surface of the material to be reinforced and is then transferred in step 32 into a non-linear (for example a wave-like or zigzag) state. In step 33 a plurality of needles then engage simultaneously or at individually determinable intervals into the semi-finished textiles product and thus take up the same. In step 34 the needles are then drawn through the material to be reinforced (again, either at like or individually determinable intervals) and each carry along an individual portion of the semi-finished textiles product, such that the semi-finished textiles product passes through the material through each individual hole. In step 35 the material is then infiltrated with a resin.

Figure 17:
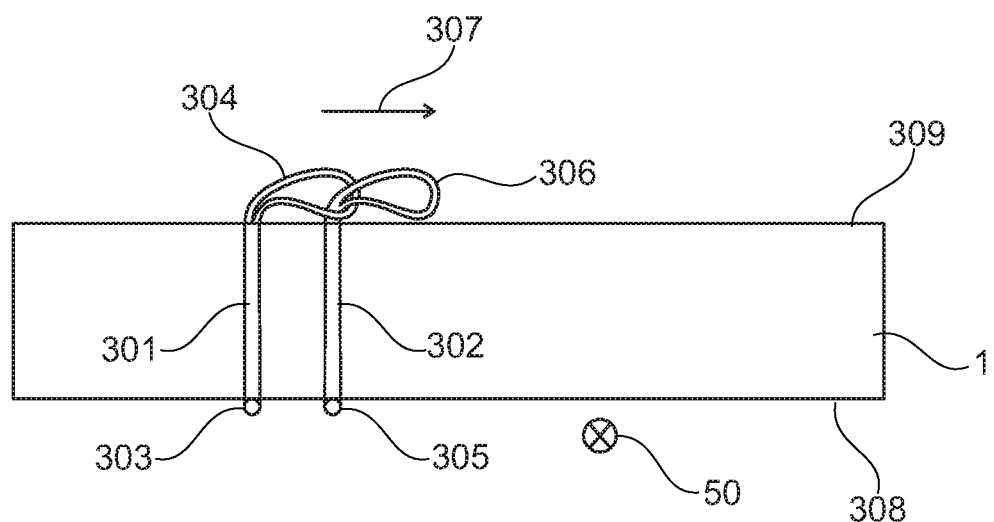
FIG. 17 shows a seam formation according to an embodiment.

FIG. 17 shows a seam formation that can be produced through application of the method. On the rear surface 308 of the material 1 to be reinforced, the semi-finished textiles products 303, 305 are parallel to one another in the direction 50 that is perpendicular to the plane of the drawing, similar to that illustrated in FIGS. 14 and 15. Individual portions 301, 302 of the semi-finished textiles product are guided through the holes produced by the needles attached to the needle beams and penetrate the surface 309 of the material 1 in the form of individual loops 304, 306. The individual loops 304, 306 are oriented parallel to the front surface 309 of the material 1 in the direction of the arrow 307, which is perpendicular to the direction 50. In a first work step, a series of loops 304 is produced, which starts from the semi-finished product portion 303, and in a second work step, a second series of individual loops 306 is produced, which is parallel to the loops of the first series and in that each loop 306 penetrates another loop of the previous series 304, as can be seen in FIG. 17.

This gives rise to a new type of seam formation, in which the direction of the semi-finished textiles product 50 on the rear surface of the material 1 encloses an angle with respect to the loop direction 307 on the surface 309 of the material 1 that does not equal 0 degree, for example it may be 35 degrees, 45 degrees or 90 degrees.

The above-described method and the above-described multi-needle machine allow for the bulk production of reinforced or strengthened materials, such as reinforced cellular materials or reinforced textiles. In particular, structural components for vehicles can be produced. The vehicles may be aircraft, landcraft or watercraft. In particular, ship hulls, car body components or hull structural components can be produced for aircraft. The spacing of the individual holes in the material may be, for example, from 5 mm to 16 mm, and the thickness of the material may be, for example, from 5 mm to 80 mm, in particular from 30 mm to 65 mm.

For the sake of completeness it should be pointed out that "comprising" and "having" do not exclude other elements or steps, and "an" or "a" do not exclude a plurality. Furthermore, it should be pointed out that features or steps that have been described with reference to one of the above embodiments may also be used in combination with other features or steps from other above-described embodiments. Reference numerals in the claims should not be deemed a restriction.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiments as set forth in the appended claims and their legal equivalents.

What is claimed is:

1. Method for producing reinforced cellular materials, reinforced textiles, and combinations thereof, the method comprising:
   guiding a plurality of needles through a material to be reinforced, such that individual needles of the plurality of needles penetrate a rear surface of the material;
   feeding, in a linear manner, a semi-finished textiles product on a side of the rear surface of the material;
   arranging the semi-finished textiles product in a non-linear manner on the side of the rear surface of the material to be reinforced by means of a subsequent displacement thereof after the semi-finished textiles product has been fed on the side of the rear surface of the material in the linear manner;
   inserting the semi-finished textiles product into the individual needles; and
   withdrawing the plurality of needles from the material, to draw a respective portion of the semi-finished textiles product by each one of the individual needles into the material in each case.

2. Method according to claim 1, further comprising:
   feeding, in a linear manner, a second portion of the semi-finished textiles product on the side of the rear surface of the material;
   wherein the semi-finished textiles product is arranged in a non-linear manner by means of a subsequent displacement thereof.

3. Method according to claim 1, wherein the semi-finished textiles product is arranged in a non-linear manner by means of the engagement of at least one of a plurality of hooks, rollers, and pegs into the semi-finished textiles product and of the subsequent displacement of the hooks, rollers or pegs in a plane which is substantially parallel to the plane of the rear surface of the material.

4. Method according to claim 3, wherein the hooks, rollers, and pegs are displaced in a sequence, such that at any point in time just one individual hook, one individual roller or one individual peg, or a sub-group of hooks, rollers or pegs, is moved.

5. Method according to claim 1, further comprising:
carrying out an intermediate stroke of the plurality of needles, such that the semi-finished textiles product is taken up by the individual needles.

6. Method according to claim 1, further comprising:
fixing the semi-finished textiles product to the rear surface of the material.

7. Method according to claim 3, further comprising the step of:
severing the semi-finished textiles product in the region of the hooks, rollers or pegs.

8. Method according to claim 3, further comprising the step of:
forming a seam by arranging a loop of the semi-finished textiles product on a front surface of the material, through which loop a further loop of the semi-finished textiles product is then drawn;
wherein the loops are arranged in a direction which has an angle that does not equal 0 degree with respect to a direction along which the semi-finished textiles product is arranged on the side of the rear surface of the material after it is drawn into the material.

9. Multi-needle machine for producing reinforced cellular materials, reinforced textiles or combinations thereof, comprising:
a plurality of needles which are movable in a stroke-like manner for piercing a material to be reinforced, for taking up a semi-finished textiles product and for drawing a respective portion of the semi-finished textiles product by each one of the plurality of needles into the material; and
a feed device for the linear arrangement of the semi-finished textiles product on a side of the rear surface of the material to be reinforced;
wherein the feed device is configured for a subsequent displacement of the linear arrangement of the semi-finished textiles product such that a non-linear arrangement of the semi-finished textiles product on the side of the rear surface of the material to be reinforced is provided after the semi-finished textiles product has been fed on the side of the rear surface of the material in the linear manner.

10. Multi-needle machine according to claim 9, further comprising:
a needle beam carrying the plurality of needles.

11. Multi-needle machine according to claim 9, wherein the feed device comprises a plurality of hooks, rollers or pegs for the non-linear arrangement of the semi-finished textiles product on the side of the rear surface of the material.

12. Method for producing reinforced cellular materials, reinforced textiles or combinations thereof, said method comprising the steps of:
guiding a plurality of needles through a material to be reinforced, such that individual needles of the plurality of needles penetrate a rear surface of the material;
arranging a semi-finished textiles product in a non-linear manner on a side of the rear surface of the material to be reinforced;
inserting the semi-finished textiles product into the individual needles;
withdrawing the plurality of needles from the material, thereby drawing a respective portion of the semi-finished textiles product by each one of the needles into the material in each case;
feeding, in a linear manner, a first portion of the semi-finished textiles product on the side of the rear surface of the material; and
feeding, in a linear manner, a second portion of the semi-finished textiles product on the side of the rear surface of the material;
wherein the semi-finished textiles product is arranged in a non-linear manner by means of a subsequent displacement thereof.

13. Method according to 1,
wherein the semi-finished textiles product is arranged in a non-linear manner by means of the engagement at least one of a plurality of hooks, rollers and pegs into the semi-finished textiles product and of the subsequent displacement of the hooks, rollers and pegs in a plane which is substantially parallel to the plane of the rear surface of the material;
wherein the hooks, rollers or pegs are displaced in a sequence, such that at any point in time just one individual hook, one individual roller or one individual peg, or a sub-group of hooks, rollers or pegs, is moved.

* * * * *